(12) United States Patent
Smith et al.

(10) Patent No.: US 11,833,511 B2
(45) Date of Patent: *Dec. 5, 2023

(54) MICROFLUIDIC DEVICES WITH MULTIPLE INLETS AND OUTLETS

(71) Applicant: International Business Machines Corporation, Armonk, NY (US)

(72) Inventors: Joshua T. Smith, Croton-on-Hudson, NY (US); Benjamin Wunsch, Mt. Kisco, NY (US); Stacey Gifford, Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 17/135,609

(22) Filed: Dec. 28, 2020

(65) Prior Publication Data

US 2021/0114027 A1   Apr. 22, 2021

Related U.S. Application Data

(63) Continuation of application No. 16/168,330, filed on Oct. 23, 2018, now Pat. No. 10,967,375.

(51) Int. Cl.
*B01L 3/00* (2006.01)
*G01N 15/10* (2006.01)
(Continued)

(52) U.S. Cl.
CPC ... *B01L 3/502746* (2013.01); *B01L 3/502761* (2013.01); *B01L 2300/0896* (2013.01);
(Continued)

(58) Field of Classification Search
CPC ......... B01L 3/502746; B01L 3/502761; G01N 15/1056
(Continued)

(56) References Cited

U.S. PATENT DOCUMENTS 6,981,522 B2  1/2006  O'Connor et al.
8,021,614 B2  9/2011  Huang et al.
(Continued)

OTHER PUBLICATIONS

Salafi, Thoriq, et al. "Advancements in microfluidics for nanoparticle separation." The Royal Society of Chemistry 2017, Lab Chip, 2017, 17, 11-33. 23 pages.
(Continued)

*Primary Examiner* — Christine T Mui
(74) *Attorney, Agent, or Firm* — Amin, Turocy & Watson, LLP

(57) ABSTRACT

Techniques regarding nanofluidic chips with a plurality of inlets and/or outlets in fluid communication with one or more nanoDLD arrays are provided. For example, one or more embodiments described herein can comprise a nanoscale deterministic lateral displacement array between and in fluid communication with a global inlet and a global outlet. The nanoscale deterministic lateral displacement array can further be between and in fluid communication with a local inlet and a local outlet. Also, the nanoscale deterministic lateral displacement array can laterally displace a particle comprised within a sample fluid supplied from the global inlet to a collection region that directs the particle to the local outlet. An advantage of such an apparatus can be the expanded versatility of the nanoscale deterministic lateral displacement array for sample preparation applications involving nanoparticles not accessible to other higher throughput microscale microfluidic technologies.

5 Claims, 10 Drawing Sheets

(51) Int. Cl.
   *B82B 3/00* (2006.01)
   *G01N 15/02* (2006.01)

(52) U.S. Cl.
   CPC ........ *B82B 3/0014* (2013.01); *G01N 15/1056* (2013.01); *G01N 2015/0288* (2013.01); *G01N 2015/1081* (2013.01)

(58) Field of Classification Search
   USPC .................................................. 422/502, 500
   See application file for complete search history.

(56) References Cited

U.S. PATENT DOCUMENTS

| | | | |
|---|---|---|---|
| 8,906,322 | B2 | 12/2014 | Huang et al. |
| 9,636,675 | B2 | 5/2017 | Astier et al. |
| 9,700,891 | B2 | 7/2017 | Smith et al. |
| 9,868,119 | B2 | 1/2018 | Astier et al. |
| 2014/0227777 | A1 | 8/2014 | Choi et al. |
| 2016/0139012 | A1 | 5/2016 | D'Silva et al. |
| 2017/0248508 | A1 | 8/2017 | Ward et al. |
| 2018/0078939 | A1 | 3/2018 | Hu et al. |
| 2018/0080060 | A1 | 3/2018 | Gifford et al. |
| 2018/0080857 | A1 | 3/2018 | Gifford et al. |

OTHER PUBLICATIONS

Contreras-Naranjo, Jose C., et al. "Microfluidics for exosome isolation and analysis: enabling liquid biopsy for personalized medicine." The Royal Society of Chemistry 2017, DOI: 10.1039/c7lc00592j. 20 pages.

Wunsch, Benjamin H., et al. "Nanoscale lateral displacement arrays for the separation of exosomes and colloids down to 20 nm." Nature Nanotechnology., vol. 11, pp. 936-940, 2016. 7 pages.

Loutherback, Kevin, et al. "Deterministic separation of cancer cells from blood at 10ml/min." AIP Advances, vol. 2, pp. 042107, 2012. 8 pages.

"Single Layer Nanofluidic Separator Chip and Fluidic Processor" U.S. Appl. No. 15/815,846, filed Nov. 17, 2018. 29 pages.

Huang, Lotien Richard, et al. "Continuous Particle Separation Through Deterministic Lateral Displacement." Science, vol. 304, pp. 987, 2004. 5 pages.

Morton, Keith, J., et al., "Crossing microfluidic streamlines to lyse, label and wash cells." The Royal Society of Chemistry 2008, Lab Chip, 2008, 8, 1448-1453. 6 pages.

Smith, et al., "Microfluidic Chips With One or More Vias" U.S. Appl. No. 15/875,940, filed Jan. 19, 2018 . 28 pages.

Non-Final Office Action received for U.S. Appl. No. 16/168,330 dated Jul. 8, 2020, 27 pages.

Final Office Action received for U.S. Appl. No. 16/168,330 dated Sep. 30, 2020, 29 pages.

Notice of Allowance received for U.S. Appl. No. 16/168,330 dated Dec. 2, 2020, 34 pages.

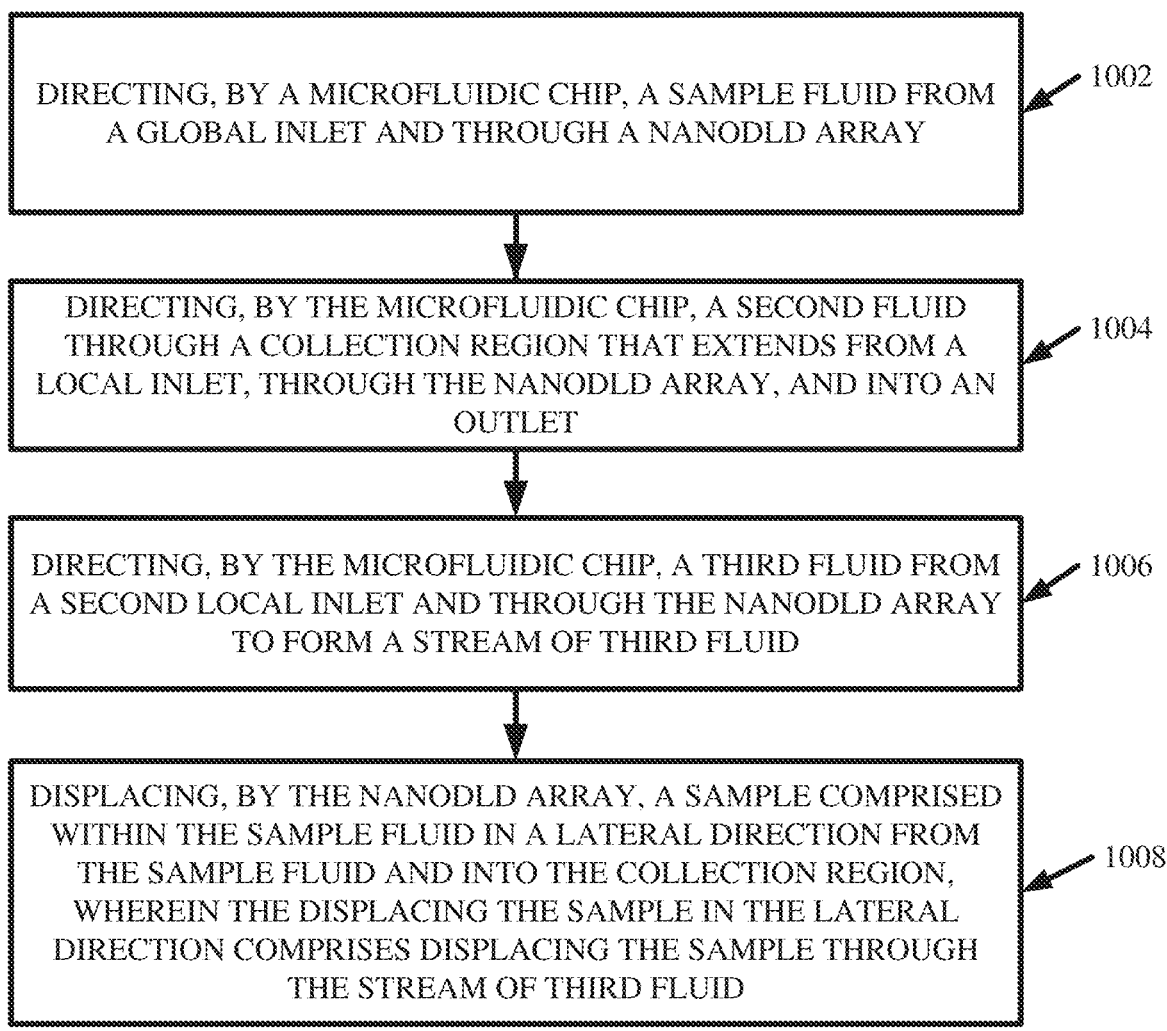

MICROFLUIDIC DEVICES WITH MULTIPLE INLETS AND OUTLETS

BACKGROUND

The subject disclosure relates to microfluidic devices comprising multiple inlets and/or outlets, and more specifically, to microfluidic chips comprising one or more nanoscale deterministic lateral displacement arrays in fluid communication with multiple inlets and/or outlets.

The need for nanoscale particle separation, concentration, and purification from complex mixtures is ubiquitous in medicine, food safety, agriculture, and biotechnology; particularly with the growing role played by genomics in these fields. For example, deoxyribonucleic acid ("DNA") and exosomes, small extracellular vesicles (EVs) containing a host of biomarkers (e.g. tumor-specific proteins, microribonucleic acid ("microRNA"), messenger ribonucleic acid ("mRNA"), and DNA), can operate as potentially powerful prognosticators and/or therapeutic agents for diagnosing, monitoring, and/or treating disease. Length-based separation of DNA has primarily been served by established techniques including gel electrophoresis, high-performance liquid chromatography, precipitation, and/or affinity capture. Similarly, for exosomes, ultracentrifugation ("UC"), filtration, precipitation, and/or affinity capture can be applied to enact a separation or purification of extracellular vesicles ("EVs"). However, conventional methods suffer from one or more of the following issues: manual preparation required from a trained technician; batch rather than continuous processing; expensive equipment necessary for operation; sample loss; inability to handle small volumes; long run times; and/or background contamination.

Microfluidic lab-on-a-chip ("LOC") devices have drawn the gaze of many academic and/or industry leaders searching overcome problems with conventional devices. Microfluidic technologies can offer: fast analysis and response time; low fabrication costs (can be mass produced and integrated into multiple processes such as labeling, purification, separation, and detection); high-throughput analysis; and/or low fluid volumes (can process with less waste, lower reagent costs when needed and/or less sample volume can be needed for a diagnostic). Within this framework, techniques employing a host of mechanisms have been explored and exploited for nanoparticle separation in general, such as field flow fractionation, centrifugal, optical, affinity capture, electrophoresis, dielectrophoresis, magnetophoresis, acoustophoresis, ion concentration polarization, electrohydrodynamic vortices, deterministic lateral displacement, and/or sieving While most of the features mentioned above for microfluidic technologies are overtly aligned with present needs, lower required fluid volumes appear to conflict with the goal of high throughput or shorter processing times when applied to sample preparation where sufficient volume is needed for downstream, off-chip analysis. It is this feature that reduces this list of usable microfluidic techniques as applied to sample preparation of nanoscale biomarkers; however, there are several of these methods that can reasonably employ high-throughput analysis to parallelize the separation process, effectively scaling the volume up.

One technology that has proven versatile in its ability to separate a range of nanoscale particles with different morphology is nanoscale lateral deterministic displacement ("nanoDLD"). NanoDLD technology shrinks deterministic lateral displacement technology to the nanoscale, demonstrating the ability to sub-fractionate exosome populations (e.g., 30-150 nanometers ("nm") in size) with tens of nanometers resolution in a continuous flow system (e.g., without batch processing). The technology can be used to demonstrate separation of DNA fragments by length with a selectively of about 200 base pairs ("bp") difference. A key challenge for nanoDLD is very low sample throughput per array (e.g., about 0.2 nanoliters per hour ("nL/hr")) owing to the technology's scaled dimensions. By contrast, micron scale DLD pillar arrays can be less fluidically restrictive and used to isolate circulating tumor cells ("CTCs") from blood at flow rates of 10 milliliters per minute ("mL/min"), or 600 mL/hr, for twinned arrays (e.g., 3 billion times faster than a single nanoDLD array. Of course, micron scale DLD arrays cannot separate nanoscale colloids, only much larger cellular material.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein can comprise apparatuses, systems, and/or methods regarding microfluidic devices with one or more nanoDLD arrays in fluid communication with multiple inlets and/or outlets are described.

According to an embodiment, an apparatus is provided. The apparatus can comprise a nanoscale deterministic lateral displacement array between and in fluid communication with a global inlet and a first outlet. The nanoscale deterministic lateral displacement array can further be between and in fluid communication with a local inlet and a second outlet. Also, the nanoscale deterministic lateral displacement array can laterally displace a particle comprised within a sample fluid supplied from the global inlet to a collection region that directs the particle to the second outlet. An advantage of such an apparatus can be the expanded versatility of the nanoscale deterministic lateral displacement array for sample preparation applications involving nanoparticles not accessible to other higher throughput microscale microfluidic technologies.

In some examples, the apparatus can comprise a second local inlet in fluid communication with the nanoscale deterministic lateral displacement array. The global inlet, the local inlet, and the second local inlet can be located at a side of the nanoscale deterministic lateral displacement array opposite the first outlet and the second outlet. An advantage of such an apparatus can be the use of multiple fluids inputted via the multiple inlets and subject to manipulation by the nanoscale deterministic lateral displacement array.

According to an embodiment, an apparatus is provided. The apparatus can comprise a layer of a microfluidic chip. The layer can comprise a nanoscale deterministic lateral displacement array positioned between and in fluid communication with a global inlet and a global outlet. The nanoscale deterministic lateral displacement array can further be positioned between and in fluid communication with a plurality of local inlets and a plurality of local outlets. The nanoscale deterministic lateral displacement array can laterally displace particles comprised within a sample fluid supplied from the global inlet to a plurality of collection regions. An advantage of such an apparatus can be the use of a microfluidic chip to perform high throughput operations using nanoscale deterministic lateral displacement technology.

In some examples, a first side of the layer can comprise the nanoscale deterministic lateral displacement array. Also, a second side of the layer can comprise a first fluid reservoir in fluid communication with the plurality of local inlets and a second fluid reservoir in fluid communication with the plurality of local outlets. An advantage of such an apparatus can be the enablement of design layouts that can arrange one or more nanoscale deterministic lateral displacement arrays in geometric formations that can facilitate high density.

According to an embodiment, a method is provided. The method can comprise directing, by a microfluidic chip, a sample fluid from a global inlet and through a nanoscale deterministic lateral displacement array. The method can also comprise directing, by the microfluidic chip, a second fluid through a collection region that extends from a local inlet, through the nanoscale deterministic lateral displacement array, and into an outlet. Further, the method can comprise displacing, by the nanoscale deterministic lateral displacement array, a sample comprised within the sample fluid in a lateral direction from the sample fluid and into the collection region. An advantage of such a method can be the use of a nanoscale deterministic lateral displacement technology with a microfluidic chip to facilitate one or more sample preparation processes.

In some examples, the method can comprise directing, by the microfluidic chip, a third fluid from a second local inlet and through the nanoscale deterministic lateral displacement array to form a stream of third fluid. Also, the displacing the sample in the lateral direction can comprise displacing the sample through the stream of third fluid. An advantage of such a method can be the enablement of complex (e.g., multi-stage) sample preparation processes using nanoscale deterministic lateral displacement technology with a microfluidic chip.

BRIEF DESCRIPTION OF THE DRAWINGS

FIG. 10 illustrates another flow diagram of an example, non-limiting method that can facilitate high throughput sample preparation and/or processing using one or more nanoDLD arrays in a microfluidic chip in accordance with one or more embodiments described herein

DETAILED DESCRIPTION

Figure 1:
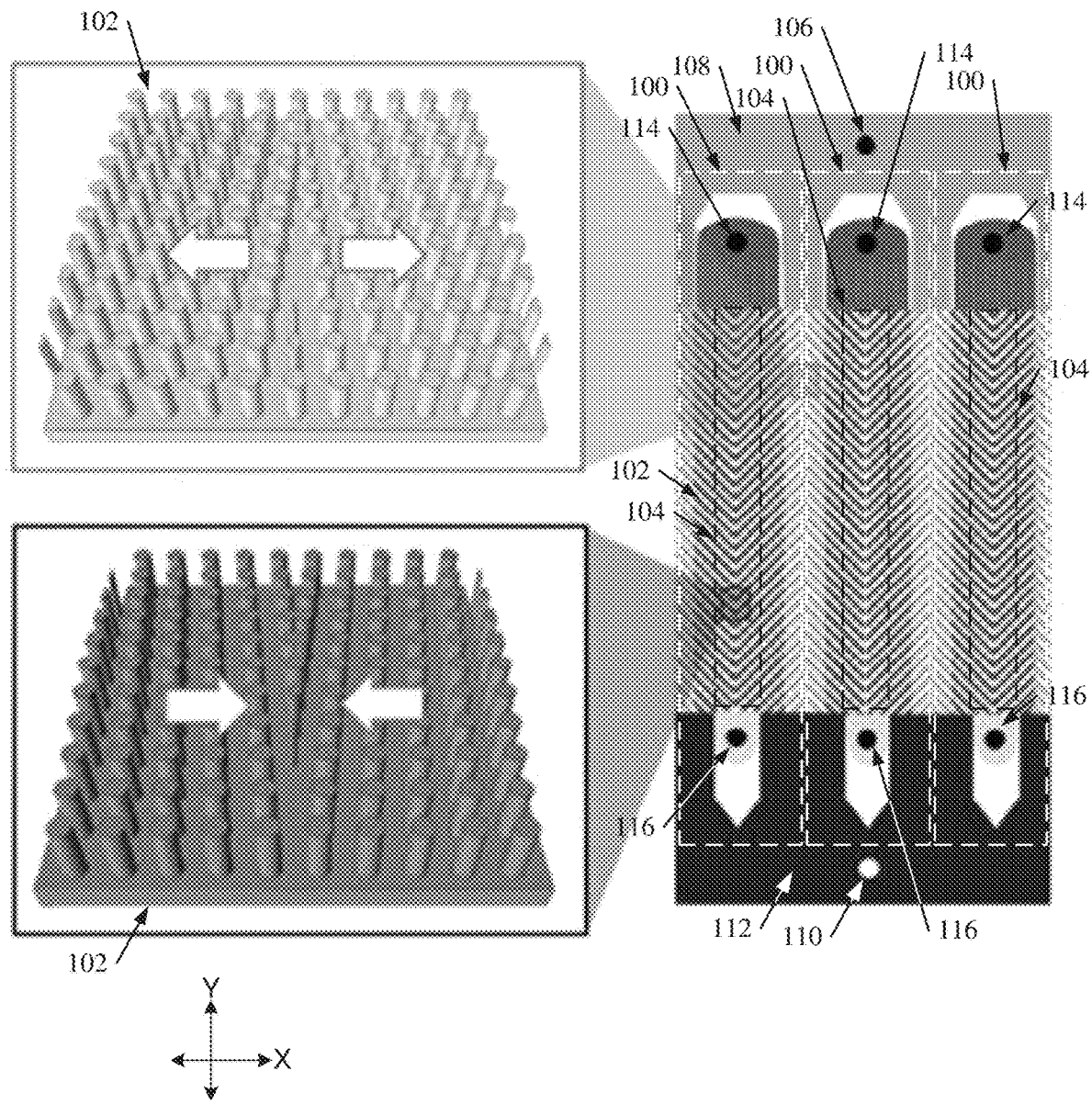
FIG. 1 illustrates a diagram of example, non-limiting microfluidic channels that can be located on layer of a microfluidic chip in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problems with conventional sample analysis and/or preparation techniques and/or the limitations of conventional microfluidic devices; the present disclosure can be implemented to produce a solution to one or more of these problems in the form of a one or more nanoDLD arrays in fluid communication with a plurality of inlets and/or a plurality of outlets. Advantageously, the use of multiple inlets and/or outlets can facilitate complex sample preparation and/or analysis techniques. Further, various embodiments described herein can regard one or more microfluidic chips that can comprise a plurality of nanoDLD arrays, each is respective communication with a plurality of inlets and/or a plurality of outlets. Advantageously, the one or more microfluidic chips described herein can perform the complex sample preparation and/or analysis techniques with a throughput rate substantially greater than conventional microfluidic techniques that use nanoDLD technology.

As used herein, the term "lab-on-a-chip ("LOC")" can refer to one or more devices that can integrate one or more laboratory functions onto an integrated circuit (e.g., a semiconductor substrate structure) to achieve autonomous preparation, screening, and/or analysis of one or more samples. LOCs can utilize microelectromechanical systems and/or microfluidic systems. One of ordinary skill in the art will recognize that a LOC devices can range in size from, for example, one or more square millimeters to one or more square centimeters.

As used herein the term "deterministic lateral displacement ("DLD")" can refer to one or more microfluidic techniques that can size fractionate a polydisperse suspension of molecules using one or more arrays of obstacles. For example, DLD arrays can laterally displace target molecules within a sample stream based on size. Further, DLD arrays can comprise a plurality of pillars arranged in a lattice structure. Rows of pillars comprising the lattice structure can be positioned offset of each other at a defined angle, and pillars can be separated from each other by a defined gap size. The defined angle and/or gap size can facilitate displacement of one or more molecules of a target size range comprised within a stream flowing through the DLD array.

As used herein the term "nanoDLD array" can refer to a DLD array that can be characterized by one or more dimensions ranging from greater than or equal to 1 nanometer (nm) and less than or equal to 999 nm. For example, a nanoDLD array can be a DLD array characterized by a gap size (e.g., a distance between adjacent pillars comprised within the lattice structure) of greater than or equal to 1 nm and less than or equal to 999 nm (e.g., greater than or equal to 25 nm and less than or equal to 250 nm).

FIG. 1 illustrates a diagram of example, non-limiting microfluidic channels 100 that can comprise one or more nanoDLD arrays 102 in fluid communication with a plurality of inlets and/or outlets in accordance with one or more embodiments described herein. Repetitive description of like elements employed in other embodiments described herein is omitted for sake of brevity. The one or more microfluidic channels 100 can be delineated by dashed white lines in FIG. 1, which depicts three microfluidic channels 100 that can share a common nanoDLD array 102. As shown in FIG. 1, the one or more microfluidic channels 100 can be positioned adjacent to each other. While FIG. 1 depicts three microfluidic channels 100 adjacent to each other, the architecture described herein is not so limited. One of ordinary skill in the art will readily recognize that fewer (e.g., two microfluidic channels 100) or greater (e.g., four or more microfluidic channels 100) microfluidic channels 100 than the three depicted in FIG. 1 can be positioned adjacent to each other and/or share a common nanoDLD array 102 based on one or more design preferences.

The one or more nanoDLD arrays 102 (e.g., represented by a plurality of diagonal lines in FIG. 1) can comprise one or more lattices of asymmetric pillars arranged in rows and/or columns. FIG. 1 shows expanded views of multiple portions of the one or more nanoDLD arrays 102 to illustrate an exemplary structure. As shown in the expanded portion, the plurality of pillars comprised within the one or more nanoDLD arrays 102 can be arranged at an angle, such that one or more rows and/or columns of the pillars can be offset from adjacent rows and/or columns of the pillars. Further, the one or more nanoDLD arrays 102 can have a uniform gap size between pillars along the width (e.g., along the "X" direction) and/or length (e.g., along the "Y" direction) of the one or more microfluidic channels 100. Alternatively, the one or more nanoDLD arrays 102 can have varying gap sizes between pillars along the width (e.g., along the "X" direction) and/or length (e.g., along the "Y" direction) of the one or more microfluidic channels 100. For example, the gap size of the one or more nanoDLD arrays 102 can decrease (e.g., gradually and/or abruptly) along the length (e.g., along the "Y" direction) of the microfluidic channel 100.

In one or more embodiments, the one or more microfluidic channels 100 can comprise respective nanoDLD arrays 102. For example, adjacent microfluidic channels 100 can comprise respective nanoDLD arrays 102. Alternatively, in various embodiments one or more of the microfluidic channels 100 can share a common nanoDLD array 102 that can extend across the total width (e.g., along the "X" direction) of the microfluidic channels 100 (e.g., as depicted in FIG. 1). As shown in FIG. 1, the nanoDLD array 102 can be configured to periodically alternate the direction of lateral displacement (e.g., represented by the "LD" arrows shown in FIG. 1) exhibited by the nanoDLD array 102 so as to displace particles towards one or more collection regions 104 (e.g., delineated by black dashed lines in FIG. 1) located in the microfluidic channels 100. For example, a nanoDLD array 102 shared by multiple microfluidic channels 100 can alternate the displacement direction at positions within the one or more collection regions 104 and between adjacent microfluidic channels 100 (e.g., as depicted by the expanded portions shown in the exemplary architecture of FIG. 1).

The one or more microfluidic channels 100 can be in fluid communication with a global inlet 106 that can supply a sample fluid to the one or more microfluidic channels 100 via one or more inlet buses 108. For example, the one or more inlet buses 108 can extend between the one or more microfluidic channels 100 to form one or more supply channels between adjacent microfluidic channels 100. The sample fluid can be directed to the one or more nanoDLD arrays 102 via the one or more supply channels. The sample fluid can comprise one or more samples and/or one more contaminants.

The one or more microfluidic channels 100 can also be in fluid communication with a global outlet 110 that can receive the sample fluid downstream of the one or more nanoDLD arrays 102 via one or more outlet busses 112. In various embodiments, the sample fluid can flow into the one or more nanoDLD arrays 102 via the one or more supply channels. While flowing through the one or more nanoDLD arrays 102, one or more samples comprised in the sample fluid can be latterly displaced (e.g., "bumped") towards a collection region 104 within a microfluidic channel 100. Contaminants comprised within the sample fluid can flow through the one or more nanoDLD arrays 102 within minimal displacement (e.g., flow in a "zig zag" through the nanoDLD array 102) and into the global outlet 110 via the one or more outlet buses 112.

Additionally, the one or more microfluidic channels 100 can comprise one or more local inlets 114 in fluid communication with the one or more nanoDLD arrays 102. The one or more local inlets 114 can supply a second fluid to the one or more microfluidic channels 100. For example, the second fluid can enter the one or more microfluidic channels 100 via the one or more local inlets 114 and flow into the one or more nanoDLD arrays 102. For example, the second fluid can flow into the one or more collection regions 104. In one or more embodiments, the second fluid can zig zag through the one or more nanoDLD arrays 102 with minimal lateral displacement. In various embodiments, the second fluid can be a buffer solution, which can facilitate purification of one or more samples laterally displaced into the collection region 104 by the one or more nanoDLD arrays 102. Additionally, the one or more local inlets 114 can be in fluid communication with one or more fluid reservoirs containing the second fluid.

Further, the one or more microfluidic channels 100 can comprise one or more local outlets 116 in fluid communication with the one or more nanoDLD arrays 102. The one or more local outlets 116 can receive fluid flowing from the collection region 104 of the microfluidic channel 100. For example, a microfluidic channel's 100 local outlet 116 can receive one or more samples laterally displaced into the collection region 104 from the sample fluid and/or the second fluid supplied to the collection region 104 by a local inlet 114. Additionally, the one or more local outlets 116 can be in fluid communication with one or more fluid reservoirs. In one or more embodiments, the one or more microfluidic channels 100 can optionally comprise one or more filters positioned between the one or more local inlets 114 and/or the one or more nanoDLD arrays 102 and/or between the global inlet 106 and/or the one or more nanoDLD arrays 102.

In an exemplary use of the one or more microfluidic channels 100 depicted in FIG. 1, a complex biological sample (e.g., blood, urine, and/or a cultured media) can be inputted to the global inlet 106. For instance, the biological sample can comprise desired sample particles such as exosomes. The biological sample can flow through the inlet bus 108 and into the one or more nanoDLD arrays 102 (e.g., via the one or more supply channels). As the biological sample flows through the one or more nanoDLD arrays 102, the desired particles (e.g., exosomes of a defined size) can be laterally displaced to a collection region 104 of one or more adjacent microfluidic channels 100. The lateral displacement can separate the desired particles from one or more smaller contaminants (e.g., proteins, lipids, and/or small molecules) in the biological sample that are too small to be laterally displaced by the one or more nanoDLD arrays 102. Thus, the desired particles can be laterally displaced from the biological sample and into a collection region 104 while one or more contaminants in the biological sample can flow through the nanoDLD arrays 102 and into one or more outlet buses 112 for collection by a global outlet 110.

Further, in the exemplary use a buffer fluid can be inputted into the one or more microfluidic channels 100 via the one or more local inlets 114. For example, the buffer fluid can be focus junction fed by a common buffer fluid reservoir defined by a gasket and in fluid communication with the one or more local inlets 114. The buffer fluid can flow from the one or more local inlets 114 into the nanoDLD array 102. For example, the buffer fluid can flow into the microfluidic channel's 100 collection region 104 located within the nanoDLD array 102. In one or more embodiments, the buffer fluid can comprise molecules too small to be laterally displaced by the one or more nanoDLD arrays 102 and thereby can flow through the nanoDLD arrays 102 with minimal displacement (e.g., can zig zag through the one or more nanoDLD arrays 102). Thereby, the buffer fluid can create a buffer stream flowing through the collection region 104, wherein the desired particles can be laterally displaced (e.g., bumped) into the buffer stream by the one or more nanoDLD arrays 102. The buffer stream comprising the displaced desired particles can flow through the collection region 104, exit the one or more nanoDLD arrays 102, and be collected by the one or more local outlets 116. The one or more local outlets 116 can direct the desired particles of the biological sample into one or more first reservoirs (e.g., one or more sample reservoirs), while the global outlet 110 can direct the contaminants of the biological sample to one or more second reservoirs (e.g., one or more waste reservoirs).

While FIG. 1 depicts the one or more microfluidic channels 100 comprising a single local inlet 114 and/or a single local outlet 116; however, the architecture of the one or more microfluidic channels 100 is not so limited. For example, a microfluidic channel 100 comprising multiple local inlets 114 and/or multiple local outlets 116 is also envisaged. Additionally, while FIG. 1 depicts one or more collection regions 104 extending to one or more local outlets 116, the architecture of the one or more microfluidic channels 100 is not so limited. For example, in one or more embodiments the one or more local outlets 116 can be repositioned laterally (e.g., along the "X" direction) so as to collect particles that zig zag through the one or more nanoDLD arrays 102 (e.g., waste particles, such as contaminants in the sample fluid), while the one or more collection regions 104 can direct bumped particles (e.g., desired particles) to the global outlet 110. In other words, the one or more collection regions 104 can extend to one or more local outlets 116 (e.g., as shown in FIG. 1) or the global outlet 110 depending on the alignment of the one or more local outlets 116. Further, the alignment of the one or more local outlets 116 can depend on whether a designer prefers the desired particles to be collected by one or more local outlets 116 or a global outlet 110.

Figure 2:
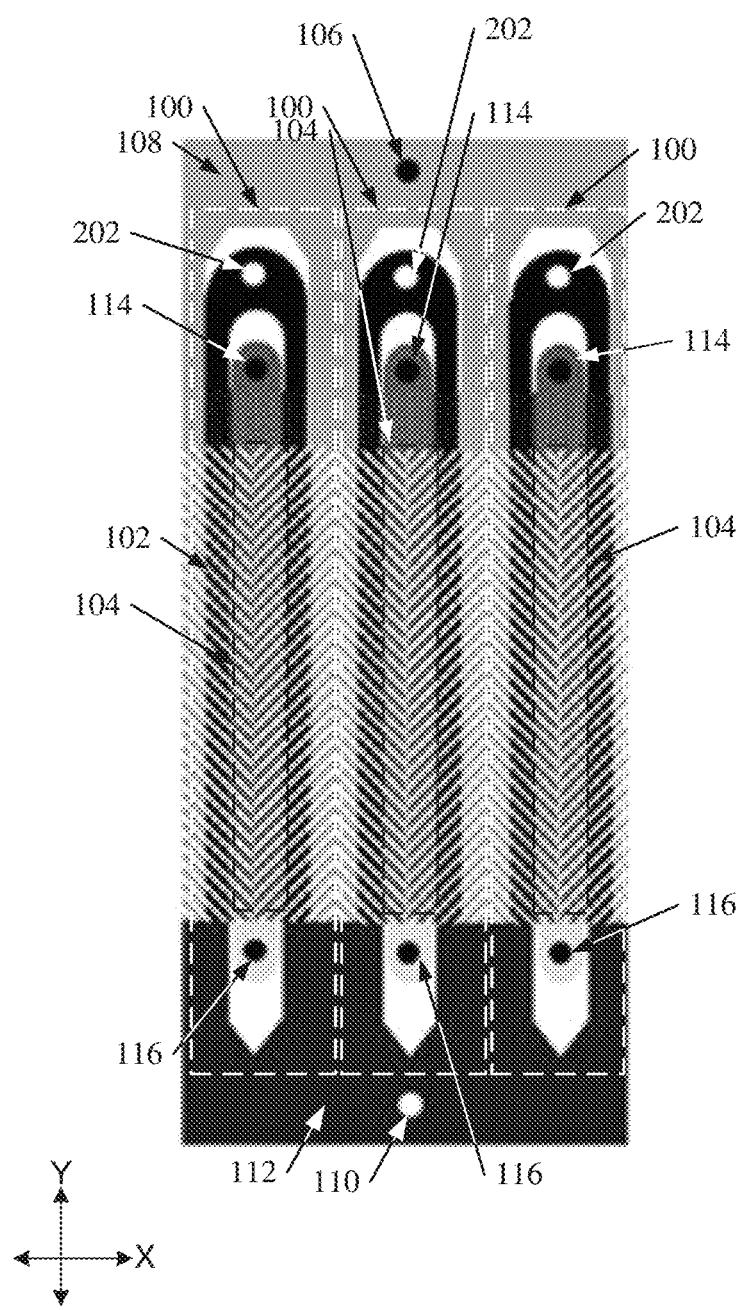
FIG. 2 illustrates another diagram of example, non-limiting microfluidic channels that can be located on layer of a microfluidic chip in accordance with one or more embodiments described herein.

FIG. 2 illustrates a diagram of the example, non-limiting microfluidic channels 100 further comprising one or more second local inlets 202 in accordance with one or more embodiments described herein. Repetitive description of like elements employed in other embodiments described herein is omitted for sake of brevity. As shown in FIG. 2, the one or more second local inlets 202 can also be in fluid communication with the one or more nanoDLD arrays 102.

The one or more second local inlets 202 can supply one or more third fluids to the one or more microfluidic channels 100. The one or more third fluids can flow from the one or more second local inlets 202, through the one or more nanoDLD arrays 102, and into the global outlet 110 (e.g., via the one or more outlet buses 112). The one or more second local inlets 202 can be in fluid communication with one or more fluid reservoirs comprising the third fluid. Also, as shown in FIG. 2, the third fluid supplied to the microfluidic channel 100 by the one or more second local inlets 202 can be introduced into one or more regions of the one or more nanoDLD arrays 102 that are adjacent to the collection region 104. In some embodiments, the third fluid can flow through the one or more nanoDLD arrays 102 with minimal displacement, thereby forming one or more streams flowing adjacent to the respective collection regions 104. The streams of the third fluid can flow outside the collection region 104 and thereby flow into the one or more outlet buses 112 rather than the one or more local outlets 116.

In an exemplary use of the one or more microfluidic channels 100 depicted in FIG. 2, a complex biological sample (e.g., blood, urine, and/or a cultured media) can be inputted to the global inlet 106. For instance, the biological sample can comprise desired sample particles such as exosomes. The biological sample can flow through the inlet bus 108 and into the one or more nanoDLD arrays 102 (e.g., via the one or more supply channels). As the biological sample flows through the one or more nanoDLD arrays 102, the desired particles (e.g., exosomes of a defined size) can be laterally displaced to a collection region 104 of one or more adjacent microfluidic channels 100. The lateral displacement can separate the desired particles from one or more smaller contaminants (e.g., proteins, lipids, and/or small molecules) in the biological sample that are too small to be laterally displaced by the one or more nanoDLD arrays 102. Thus, the desired particles can be laterally displaced from the biological sample and into a collection region 104 while one or more contaminants in the biological sample can flow through the nanoDLD arrays 102 and into one or more outlet buses 112 for collection by a global outlet 110.

Additionally, in the exemplary use a labeling fluid can be inputted into the one or more microfluidic channels 100 via the one or more second local inlets 202. For example, the labeling fluid can comprise one or more molecules having an affinity to couple with the one or more desired particles. The one or more molecules can be readily identifiable optically, electrochemically, and/or magnetically; thereby rendering the desired particles readily identifiable when coupled with the labeling fluid. For instance, the labeling fluid can facilitate one or more optical labeling techniques including, but not limited to: enzymatic labeling, chemical labeling, immunochemical labeling, protein labeling, genetic labeling, DNA intercalating agents, a combination thereof and/or the like. The labeling fluid can be focus junction fed by a common labeling fluid reservoir defined by a gasket and in fluid communication with the one or more second local inlets 202.

The labeling fluid can flow from the one or more second local inlets 202 into the one or more nanoDLD arrays 102. In one or more embodiments, the labeling fluid can comprise labeling molecules too small to be laterally displaced by the one or more nanoDLD arrays 102 and thereby can flow through the nanoDLD arrays 102 with minimal displacement (e.g., can zig zag through the one or more nanoDLD arrays 102). Thereby, the labeling fluid can create one or more labeling streams flowing through the one or more nanoDLD arrays 102 (e.g., adjacent to the collection region 104). The desired particles can be laterally displaced (e.g., bumped) into one or more of the labeling streams by the one or more nanoDLD arrays 102 while being directed, by the one or more nanoDLD arrays 102, into a collection region 104. Labeling molecules of the labeling fluid that do not couple with one or more desired particles can remain in the one or more labeling streams and/or flow into the one or more outlet buses 112. In contrast, labeling molecules that couple with one or more desired particles being laterally displaced through the one or more labeling streams can be displaced with the one or more desired particles into the one or more collection regions 104.

Further, in the exemplary use a buffer fluid can be inputted into the one or more microfluidic channels 100 via the one or more local inlets 114. For example, the buffer fluid can be focus junction fed by a common buffer fluid reservoir defined by a gasket and in fluid communication with the one or more local inlets 114. The buffer fluid can flow from the one or more local inlets 114 into the nanoDLD array 102. For example, the buffer fluid can flow into the microfluidic channel's 100 collection region 104 located within the nanoDLD array 102. In one or more embodiments, the buffer fluid can comprise molecules too small to be laterally displaced by the one or more nanoDLD arrays 102 and thereby can flow through the nanoDLD arrays 102 with minimal displacement (e.g., can zig zag through the one or more nanoDLD arrays 102). Thereby, the buffer fluid can create a buffer stream flowing through the collection region 104, wherein the labeled desired particles (e.g., desired particles coupled with one or more labeling molecules due to an interaction with one or more labeling streams during lateral displacement) can be laterally displaced (e.g., bumped) into the buffer stream by the one or more nanoDLD arrays 102. The buffer stream comprising the displaced and labelled desired particles can flow through the collection region 104, exit the one or more nanoDLD arrays 102, and be collected by the one or more local outlets 116. The one or more local outlets 116 can direct the labeled desired particles of the biological sample into one or more first reservoirs (e.g., one or more sample reservoirs), while the global outlet 110 can direct the contaminants of the biological sample to one or more second reservoirs (e.g., one or more waste reservoirs). Therefore, the configuration depicted in FIG. 2 can facilitate purifying and labeling one or more samples within a single microfluidic channel 100 using one or more nanoDLD arrays 102.

Figure 3:
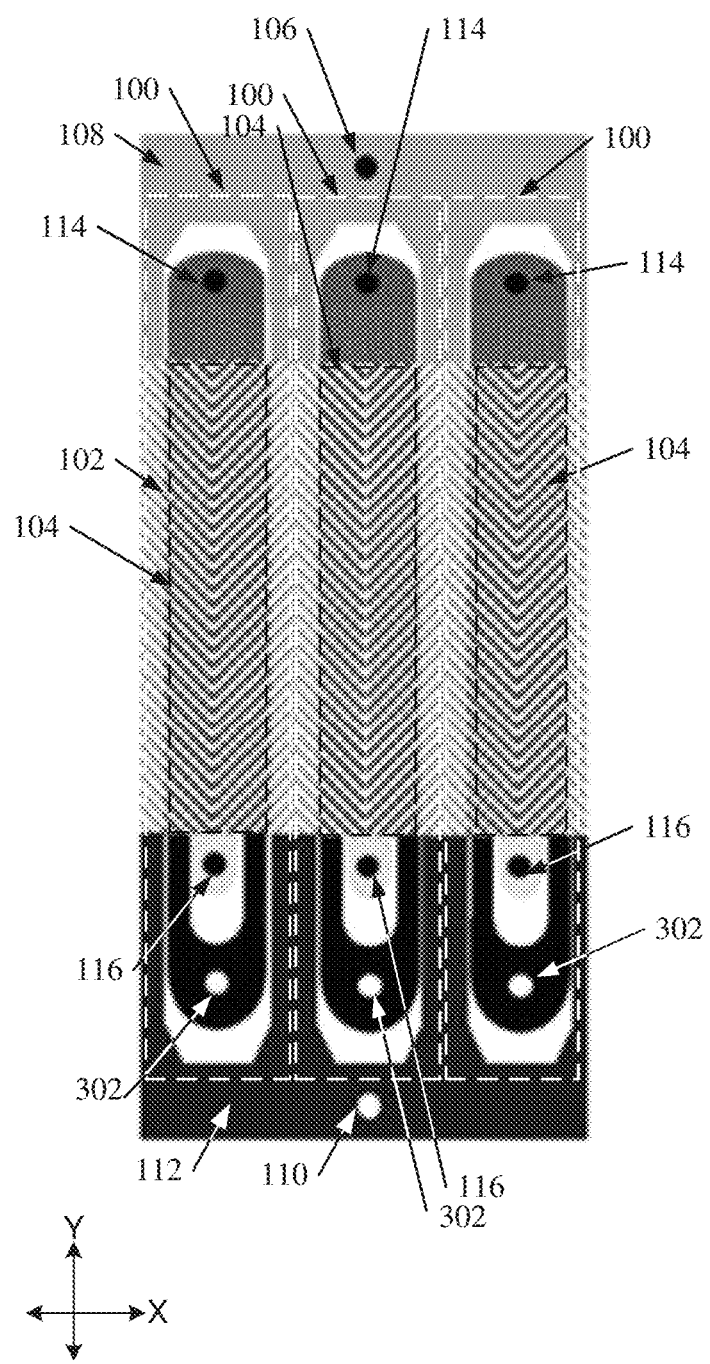
FIG. 3 illustrates another diagram of example, non-limiting microfluidic channels that can be located on layer of a microfluidic chip in accordance with one or more embodiments described herein.

FIG. 3 illustrates a diagram of the example, non-limiting microfluidic channels 100 further comprising one or more second local outlets 302 in accordance with one or more embodiments described herein. Repetitive description of like elements employed in other embodiments described herein is omitted for sake of brevity. As shown in FIG. 3 the one or more second local outlets 302 can also be in fluid communication with the one or more nanoDLD arrays 102.

As shown in FIG. 3, the one or more collection regions 104 can direct fluids into both the one or more local outlets 116 and/or the one or more second local outlets 302. For example, fluids exiting from a central portion of the one or more collection regions 104 can be collected by the one or more local outlets 116, while fluids exiting from perimeter portions of the one or more collection regions 104 can be collected by the one or more second local outlets 302. For instance, the one or more nanoDLD arrays 102 can laterally displace particles to different positions within the one or more collection regions 104 based on the size of the particles and/or the geometry of the one or more nanoDLD arrays 102. For example, the one or more nanoDLD arrays 102 can laterally displace particles of a first size into a central portion of the one or more collection regions 104, while laterally displacing particles of a second size (e.g., a size smaller than the first size) into a periphery portion (e.g., along the perimeter) of the one or more collection regions 104. For instance, the gap size of the one or more nanoDLD arrays 102 can vary along the width (e.g., along the "X" direction) of the one or more microfluidic channels 100 to facilitate one or more sub-fractionations of particles displaced from the stream of sample fluid.

Therefore, the one or more nanoDLD arrays 102 can fractionate particles from the sample fluid into the one or more collection regions 104 and/or sub-fractionate particles in the one or more collection regions 104 into various portions of the one or more collection regions 104. Further, fractionated particles from the sample fluid can be collected by either the one or more local outlets 116 or the one or more second local outlets 302 based on the sub-fractionation occurring within the one or more collection regions 104. For example, molecules of the sample fluid that are not fractionated by the one or more nanoDLD arrays 102 can be collected by the global outlet 110, particles fractionated from the sample fluid by the one or more nanoDLD arrays 102 can be collected by the one or more second local outlets 302, and/or particles sub-fractionated, by the one or more nanoDLD arrays 102, from the fractionated particles can be collected by the one or more local outlets 116.

The microfluidic channel 100 configurations depicted and/or described herein with regards to FIGS. 2 and/or 3 can exemplify that the one or more microfluidic channels 100 can comprise a plurality of localized inlets and/or a plurality of localized outlets. The architecture of one or more microfluidic channels 100 is not limited to the number of localized inlets and/or the number of localized outlets depicted in the configurations of FIGS. 2 and 3. For example, the one or more microfluidic channels 100 can comprise more localized inlets than the two depicted in FIG. 2 (e.g., local inlet 114 and/or second local inlet 202). One of ordinary skill in the art will readily recognize that the features and/or principals described herein to introduce an additional localized inlet (e.g., second local inlet 202) to the architecture of the one or more microfluidic channels 100 can be expanded and/or repeated to introduce further localized inlets (e.g., configurations comprising local inlet 114, second local inlet 202, and/or a third local inlet). Further, each additional localized inlet can supply a respective fluid into the one or more microfluidic channels 100 to facilitate additional preparation, screening, and/or analysis operations. In another example, the one or more microfluidic channels 100 can comprise more localized outlets than the two depicted in FIG. 3 (e.g., local outlet 116 and/or second local outlet 302). One of ordinary skill in the art will readily recognize that the features and/or principals described herein to introduce an additional localized outlet (e.g., second local outlet 302) to the architecture of the one or more microfluidic channels 100 can be expanded and/or repeated to introduce further localized outlets (e.g., configurations comprising local outlet 116, second local outlet 302, and/or a third local outlet). Further, each additional localized outlet can collect a respective size group of fractionated particles from the sample fluid.

Additionally, configurations of the one or more microfluidic channels 100 that combine one or more of the various features described herein are also envisaged. For example, a configuration of the one or more microfluidic channels 100 comprising the one or more second local inlets 202 and the one or more second local outlets 302 is also envisaged.

Figure 4:
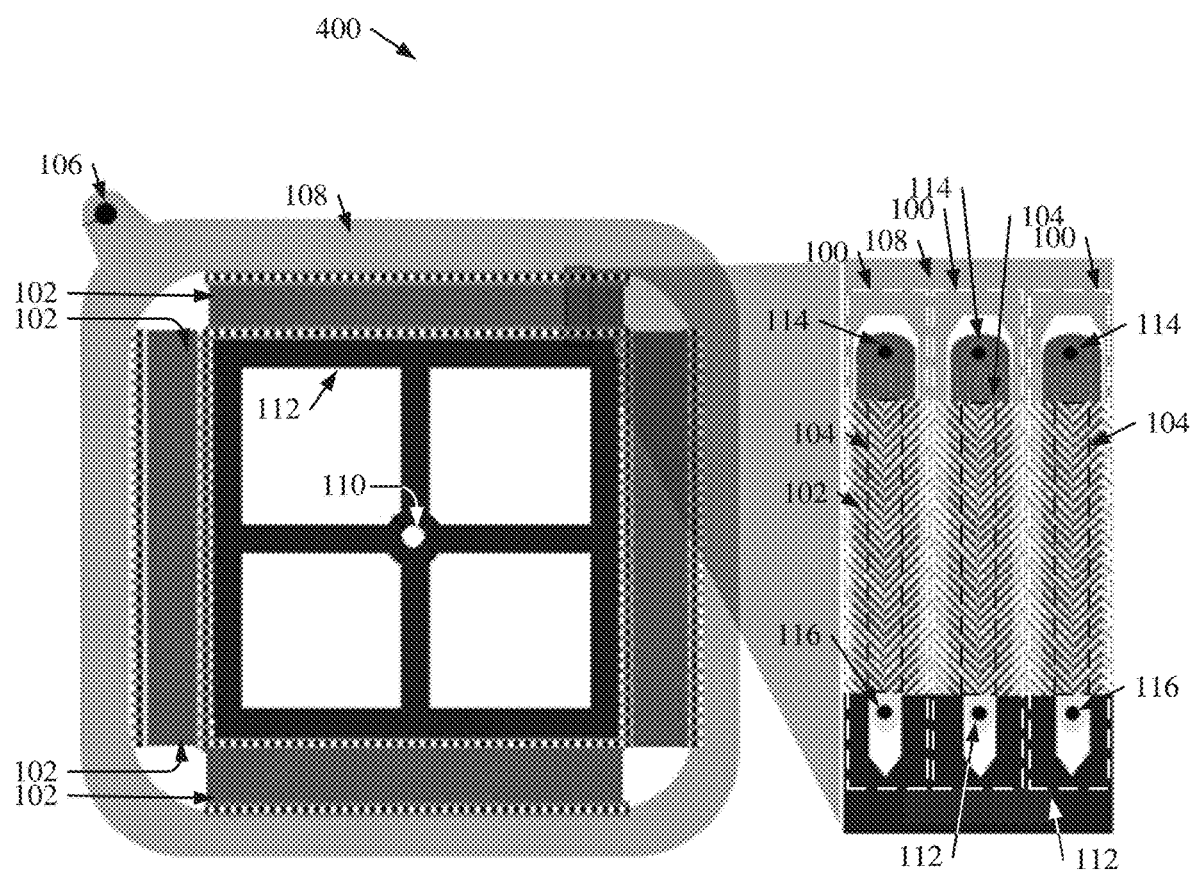
FIG. 4 illustrates a diagram of an example, non-limiting first surface of a microfluidic chip layer that can comprise a plurality of nanoDLD arrays in fluid communication with a plurality of inlets and/or outlets in accordance with one or more embodiments described herein.

FIG. 4 illustrates a diagram of an example, non-limiting first side 400 of a microfluidic chip layer that can comprise a plurality of microfluidic channels 100 in accordance with one or more embodiments described herein. Repetitive description of like elements employed in other embodiments described herein is omitted for sake of brevity. As shown in FIG. 4, a plurality of the microfluidic channels 100 described herein can be arranged on the first side 400 of a microfluidic chip layer to facilitate a high throughput of a sample fluid.

The first side 400 can comprise a plurality of nanoDLD arrays 102, wherein each nanoDLD array 102 can be comprised within a plurality of microfluidic channels 100. For example, FIG. 4 depicts a first side 400 comprising four nanoDLD arrays 102 (e.g., one on each side of the first side 400). Further, an expanded portion of the first side 400 delineates that the each of the nanoDLD arrays 102 can be shared by a plurality of microfluidic channels 100 arranged in accordance with one or more embodiments described herein.

The plurality of nanoDLD arrays 102, and/or thereby the plurality of microfluidic channels 100, can be in fluid communication with a common global inlet 106 via an inlet bus 108 that can extend around the perimeter of the first side 400 and/or reach each of the nanoDLD arrays 102 and/or microfluidic channels 100. Similarly, the plurality of nanoDLD arrays 102, and/or thereby the plurality of microfluidic channels 100, can be in fluid communication with a common global outlet 110 via an outlet bus 112 that can extend to each of the nanoDLD arrays 102 and/or microfluidic channels 100.

The expanded portion of FIG. 4 shows an exemplary configuration of the plurality of microfluidic channels 100. While FIG. 4 depicts a first side 400 comprising multiple microfluidic channels 100 having the configuration depicted and/or described with regards to FIG. 1, the architecture of the first side 400 is not so limited. As described herein, one or more of the plurality of microfluidic channels 100 can comprise a plurality of localized inlets and/or a plurality of localized outlets. For example, one or more of the plurality of microfluidic channels 100 can have the exemplary configurations depicted and/or described with regards to FIGS. 2 and/or 3. Further, in some embodiments, a plurality of microfluidic channels 100 sharing a first nanoDLD array 102 on the first side 400 can have a different configuration (e.g., a different number of localized inlets and/or outlets) than a plurality of microfluidic channels 100 sharing a second nanoDLD array 102 on the first side 400.

Figure 5:
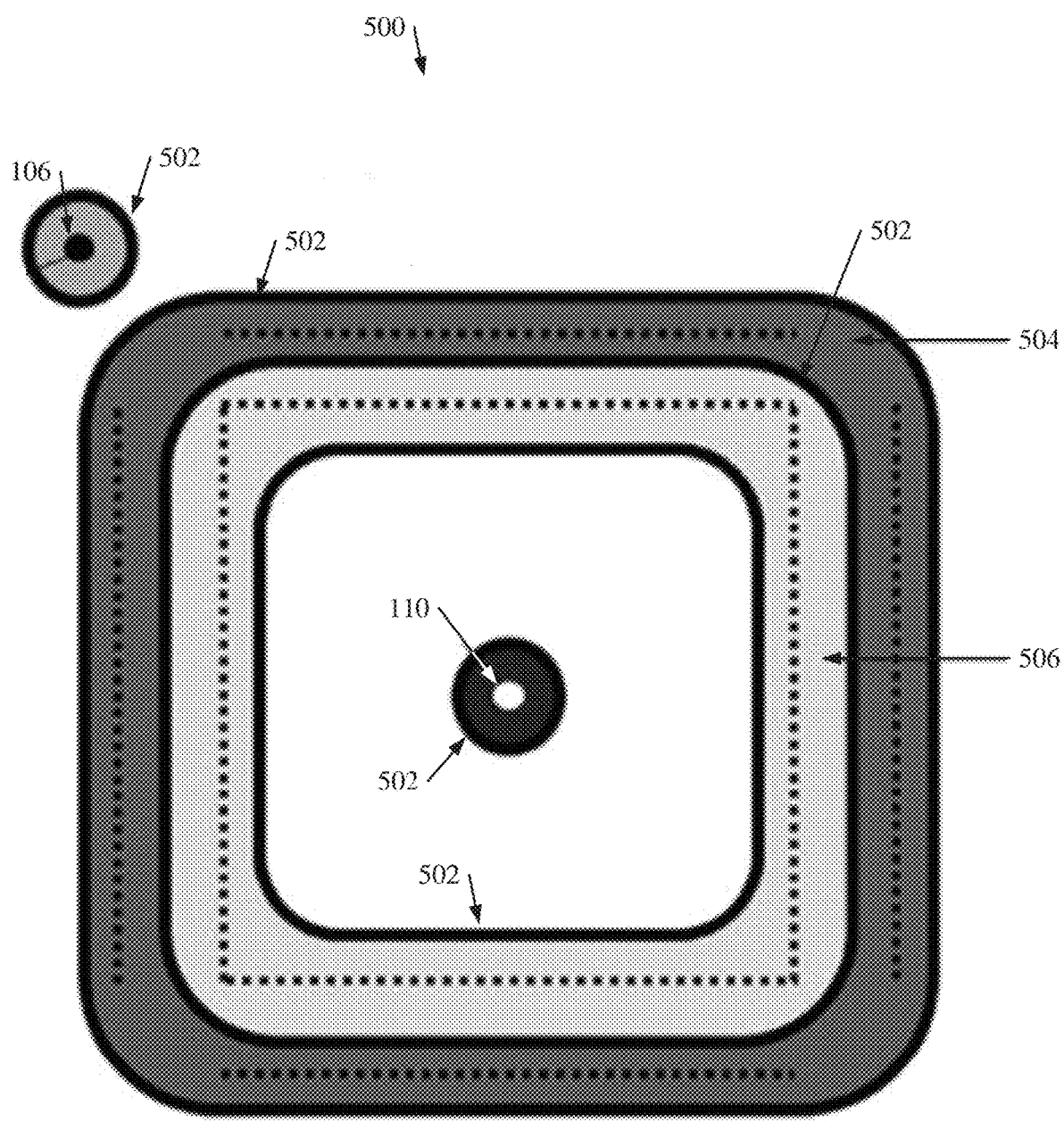
FIG. 5 illustrates a diagram of an example, non-limiting second surface of a microfluidic chip layer that can comprise a plurality of fluid reservoirs arranged based on the alignment of one or more nanoDLD arrays positioned on another layer of the microfluidic chip in accordance with one or more embodiments described herein.

FIG. 5 illustrates a diagram of an example, non-limiting second side 500 of the microfluidic chip layer that can comprise a plurality of reservoirs to facilitate supplying fluid to and/or collecting fluid from the plurality of microfluidic channels 100 comprised on the first layer 400 in accordance with one or more embodiments described herein. Repetitive description of like elements employed in other embodiments described herein is omitted for sake of brevity. In various embodiments, the first side 400 can be a front side of the microfluidic layer, while the second side can be a backside of the same microfluid layer. In one or more embodiments, the second side 500 can be comprised on a microfluidic chip layer that is separate and/or distinct from a microfluidic chip layer comprising the first side 400. Also, the configuration of the second side 500 can correspond to the configuration of microfluidic channels 100 and/or nanoDLD arrays 102 positioned on the first side 400. For instance, the black dots depicted in FIG. 5 can be presented solely for clarification purposes and/or can represent where the plurality of localized inlets (e.g., the plurality of local inlets 114) and/or localized outlets (e.g., the plurality of local outlets 116) can align with the second side.

In one or more embodiments the global inlet 106 and/or the global outlet 110 can extend through the first side 400 and/or the second side 500 of the microfluidic chip (e.g., as shown in FIG. 5). Additionally, in various embodiments, the second side 500 can comprise one or more seals 502 (e.g., O-rings) that can define a plurality of fluid reservoirs. For example, the one or more seals 502 can define a first fluid reservoir 504 that can be aligned with the plurality of localized inlets (e.g., plurality of local inlets 114) comprising the multiple microfluidic channels 100 of the first side 400. For instance, the plurality of black dots shown in the first fluid reservoir 504 in FIG. 5 can represent where the plurality of localized inlets from the microfluidic channels 100 of the first side 400 would align. Additionally, the one or more seals 502 can define a second fluid reservoir 506 that can be aligned with the plurality of localized outlets (e.g., plurality of local outlets 116) comprising the multiple microfluidic channels 100 of the first side 400. For instance, the plurality of black dots shown in the second fluid reservoir 506 504 in FIG. 5 can represent where the plurality of localized outlets from the microfluidic channels 100 of the first side 400 would align.

In various embodiments, the first fluid reservoir 504 can be in fluid communication with plurality of microfluidic channels 100 of the first side 400 via the plurality of localized inlets (e.g., the plurality of local inlets 114). For example, the first fluid reservoir 504 can contain a fluid (e.g., a buffer fluid) that can be supplied to the plurality of microfluidic channels 100 via the one or more localized inlets. Also, the second fluid reservoir 506 can be in fluid communication with plurality of microfluidic channels 100 of the first side 400 via the plurality of localized outlets (e.g., the plurality of local outlets 116). For example, the second fluid reservoir 506 can contain fluid (e.g., one or more samples) collected by the plurality of localized outlets of the microfluidic channels 100 of the first side 400. Further, the plurality of fluid reservoirs can comprise one or more respective access vias (not shown) to facilitate supplying fluid to the fluid reservoir and/or collecting fluid from the fluid reservoir.

While FIG. 5 depicts the second side 500 comprising two fluid reservoirs (e.g., first fluid reservoir 504 and/or second fluid reservoir 506), the architecture of the second side 500 is not so limited. For example, the second side 500 can comprise additional fluid reservoirs based on the number of localized inlets (e.g., local inlets 114) and/or localized outlets (e.g., local outlets 116) comprised within the plurality of microfluidic channels 100 positioned on the first side 400. For instance, wherein the plurality of microfluidic channels 100 on an adjacent first side 400 comprise second local inlets 202, the second side 500 can comprise one or more additional fluid reservoir (e.g., defined by the one or more seals 502) aligned and in fluid communication with the plurality of second local inlets 202 so as to supply a fluid to the microfluidic channels 100 via the one or more second local inlets 202. In another instance, wherein the plurality of microfluidic channels 100 on an adjacent first side 400 comprise second local outlets 302, the second side 500 can comprise one or more additional fluid reservoir (e.g., defined by the one or more seals 502) aligned and in fluid communication with the plurality of second local outlets 302 so as to facilitate collection of sub-fractionated groups of sample from the plurality of microfluidic channels 100.

Figure 6:
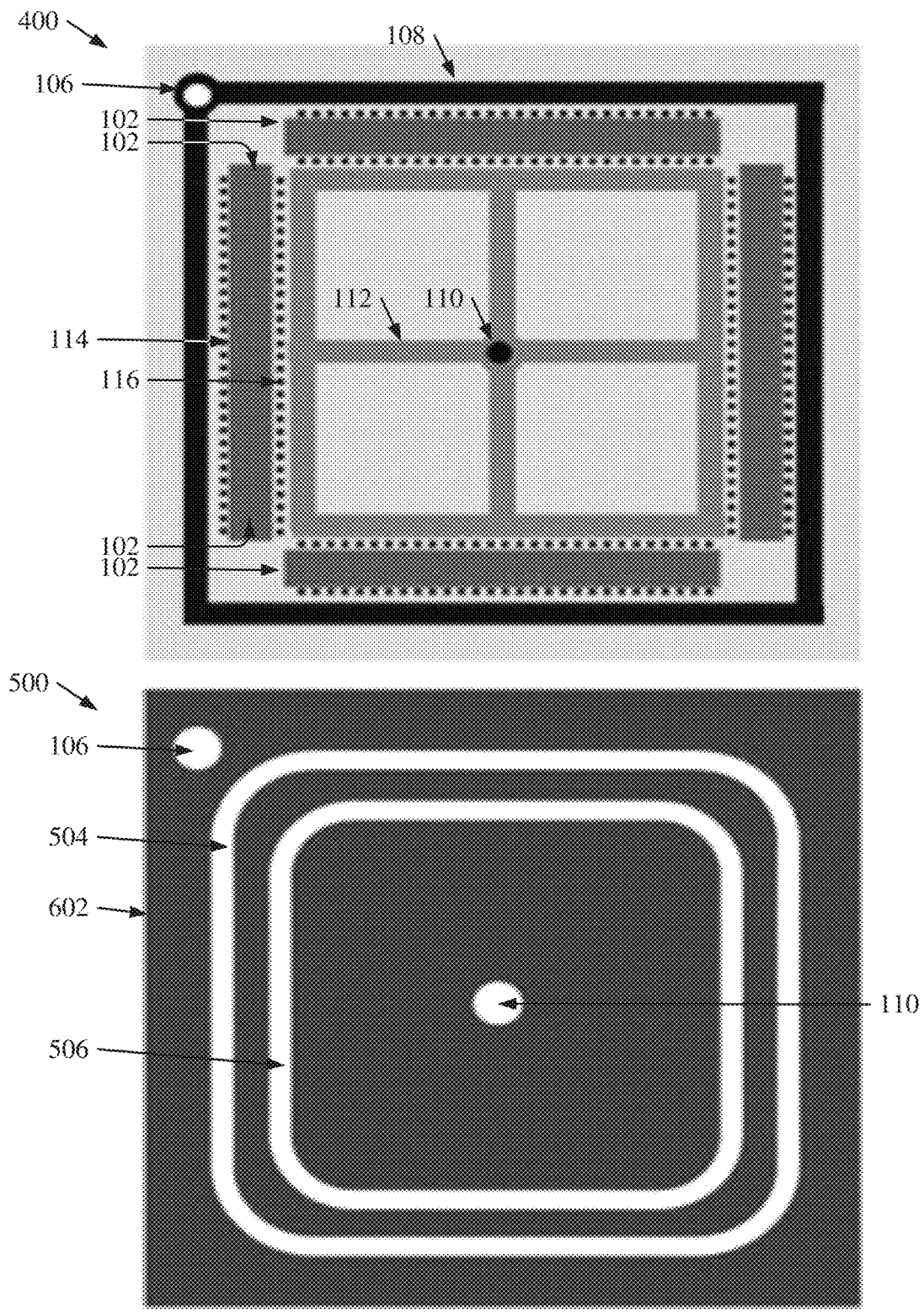
FIG. 6 illustrates a diagram of an example, non-limiting reservoir gasket that can comprise a surface of a microfluidic chip layer in accordance with one or more embodiments described herein.

FIG. 6 illustrates a diagram of an example, non-limiting reservoir gasket 602 that can comprise the one or more second sides 500 of the one or more microfluidic chips in accordance with one or more embodiments described herein. Repetitive description of like elements employed in other embodiments described herein is omitted for sake of brevity. In various embodiments, the plurality of reservoirs comprising one or more second sides 500 can be defined by one or more reservoir gaskets 602 in additional to and/or alternatively to the one or more seals 502 described herein. For example, the one or more reservoir gaskets 602 can comprise a gasket with one or more voids that can define the plurality of reservoirs. For instance, a first void in the reservoir gasket 602 can define the first fluid reservoir 504, and a second void in the reservoir gasket 604 can define the second fluid reservoir 506. Additionally, the reservoir gasket 602 can comprise further voids to enable the global inlet 106 and/or the global outlet 110 to traverse through the reservoir gasket 602.

Example materials that can comprise the one or more reservoir gaskets 602 can include, but are not limited to: polymers (e.g., elastomers), thermosets, thermoplasts, super-molecular polymers, block copolymers, a combination thereof, and/or the like. In various embodiments, the one or more reservoir gaskets 602 can be created from one or more manufacturing processes, including, but not limited to: three-dimensional printing, stamping, embossing, injection molding, laser cutting, ablating from a polymeric starting material, additive machining (e.g., laser-induced ink printing, polymerization, stereolithography, and/or three-dimensional extrusion printing), a combination thereof, and/or the like.

FIG. 6 also depicts an exemplary first side 400 that can be adjacent to the exemplary second side 500. Presenting the first side 400 next to the second side 500 can exemplify that the position, number, and/or configuration of the plurality of reservoirs of the second side 500 can be based on the position, number, and/or configuration of the microfluidic channels 100 comprised on the first side 400.

In one or more embodiments, a plurality of microfluidic channels 100 can be positioned on the first side 400 in various configurations to facilitate a high density of microfluidic channels 100 in the microfluidic chip. Advantageously, by utilizing many microfluidic channels 100, the microfluidic chips described herein can implement nanoscale DLD technology while achieving higher throughput rates than conventional techniques. Further, the second side 500 can enable simultaneous fluid loading of all inlets associated with a particular fluid. For example, the plurality of local inlets 114 on the first side 400 can be simultaneously supplied fluid (e.g., a buffer fluid) from a fluid reservoir (e.g., the first fluid reservoir 504) on the second side 500. In another example, while the plurality of local inlets 114 are being supplied fluid, a plurality of second local inlets 202 on the first side 400 can be simultaneously suppled a second fluid (e.g., a labeling fluid) from another fluid reservoir on the second side 500. By supplying fluid to multiple microfluidic channels 100 via a common reservoir, the microfluidic chip can minimize the number of required access vias needed to load the subject fluid (e.g., each fluid reservoir can have one respective access via). Similarly, by collecting samples from multiple microfluidic channels 100 in a common reservoir, the microfluidic chip can minimize the number of required access vias needed to extract the subject samples.

One of ordinary skill in the art will readily recognize that the microfluidic channels 100 and/or the features of the first side 400 and/or second side 500 described herein can be implemented in a microfluidic chip in a variety of configurations to facilitate one or more desired performance characteristics (e.g., a desired throughput rate). For example, while FIGS. 4 and/or 6 depict a nanoDLD array 102 configuration comprising four nanoDLD arrays 102 positioned on respective sides of the first side 400, additional configurations of nanoDLD arrays 102 are also envisaged. Additionally, fluid reservoir configurations based on the configuration of nanoDLD arrays 102 on an adjacent first side 400 are also envisaged. For example, the first side 400 can comprise a plurality of nanoDLD arrays 102 arranged in various geometric configurations, which can include, but are not limited to: square configurations, circular configurations, Greek spiral configurations, serpentine configurations, cross configurations (e.g., in the shape of an "x" and/or "+"), interdigitated configurations, tree configurations, convergent and/or divergent fractal network configurations, space-filled raster configurations, a combination thereof, and/or the like. Likewise, the second side 500 can comprise a plurality of fluid reservoirs arranged in various geometric configurations, which can include, but are not limited to: square configurations, circular configurations, Greek spiral configurations, serpentine configurations, cross configurations (e.g., in the shape of an "x" and/or "+"), interdigitated configurations, tree configurations, convergent and/or divergent fractal network configurations, space-filled raster configurations, a combination thereof, and/or the like.

Figure 7:
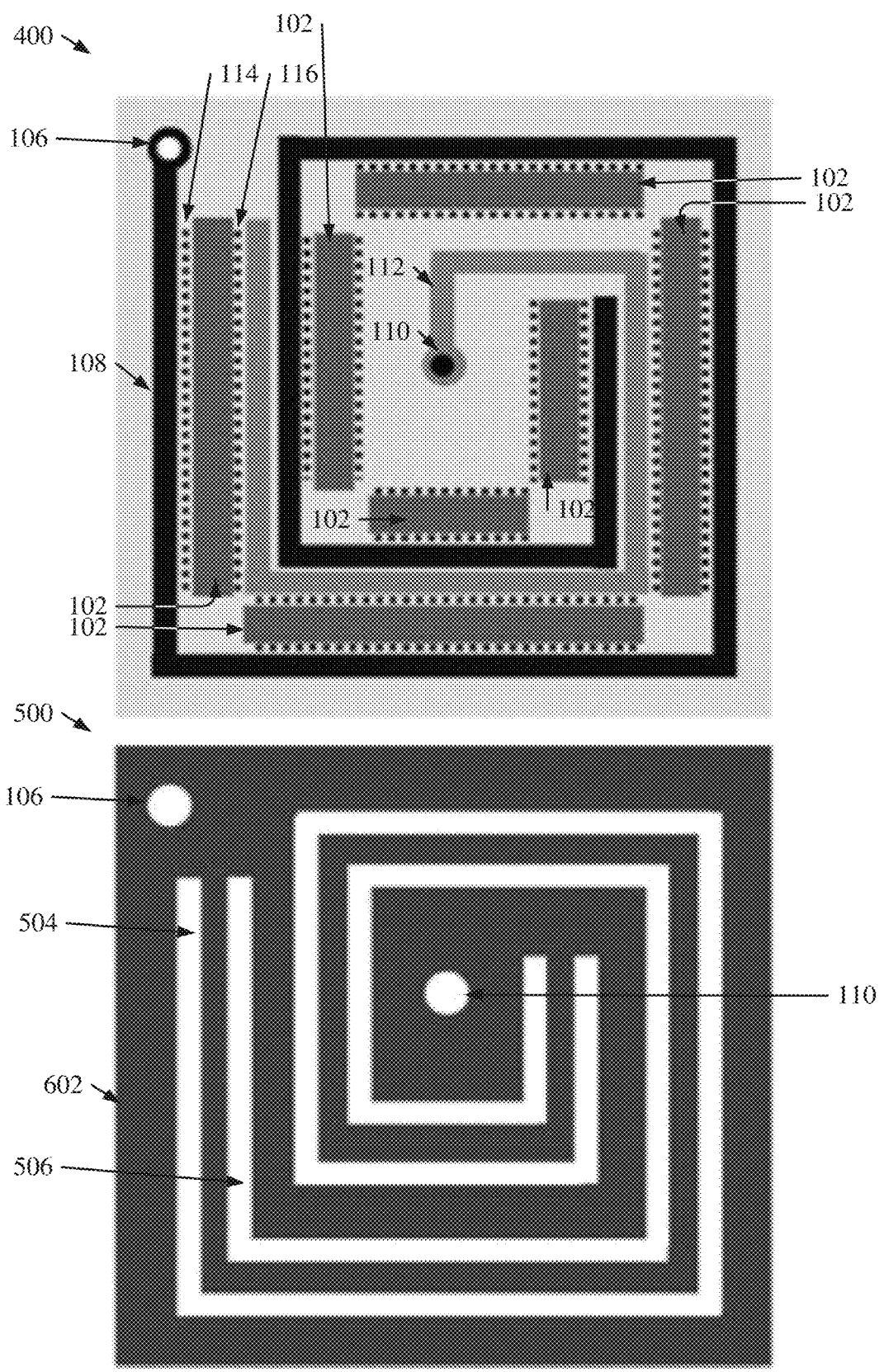
FIG. 7 illustrates another diagram of an example, non-limiting reservoir gasket that can comprise a surface of a microfluidic chip layer in accordance with one or more embodiments described herein.

FIG. 7 illustrates a diagram of an example, non-limiting Greek spiral configuration of nanoDLD arrays 102 on the first side 400 and/or a corresponding Greek spiral configuration of fluid reservoirs (e.g., a first fluid reservoir 504 and/or a second fluid reservoir 506) on the second side 500. Repetitive description of like elements employed in other embodiments described herein is omitted for sake of brevity. As shown in FIG. 7, the plurality of nanoDLD arrays 102 and/or the plurality of fluid reservoirs described herein can be arranged in one or more configurations to facilitate increased density in the microfluidic chip, such as a Greek spiral configuration.

Figure 8:
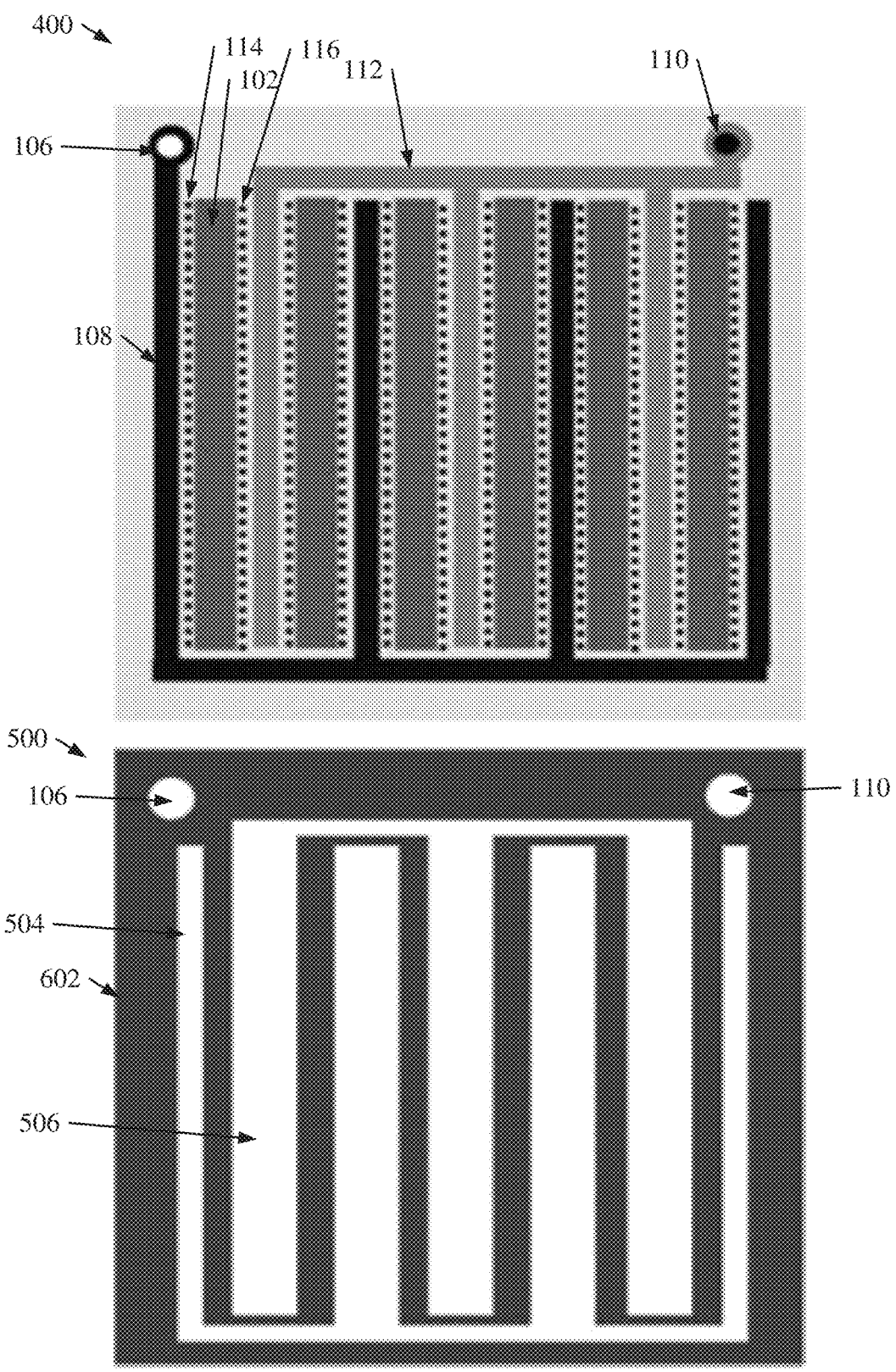
FIG. 8 illustrates another diagram of an example, non-limiting reservoir gasket that can comprise a surface of a microfluidic chip layer in accordance with one or more embodiments described herein.

FIG. 8 illustrates a diagram of an example, non-limiting serpentine configuration of nanoDLD arrays 102 on the first side 400 and/or a corresponding serpentine configuration of fluid reservoirs (e.g., a first fluid reservoir 504 and/or a second fluid reservoir 506) on the second side 500. Repetitive description of like elements employed in other embodiments described herein is omitted for sake of brevity. As shown in FIG. 8, the plurality of nanoDLD arrays 102 and/or the plurality of fluid reservoirs described herein can be arranged in one or more configurations to facilitate increased density in the microfluidic chip, such as a serpentine configuration.

Figure 9:
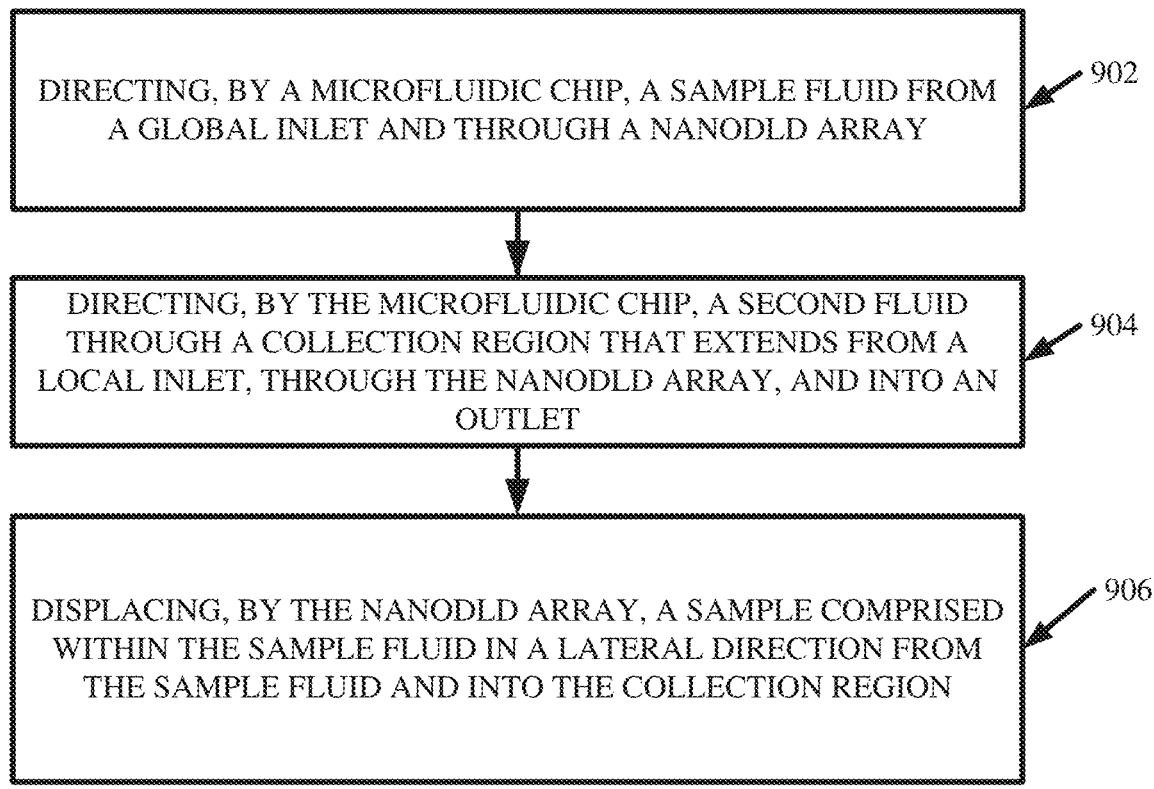
FIG. 9 illustrates a flow diagram of an example, non-limiting method that can facilitate high throughput sample preparation and/or processing using one or more nanoDLD arrays in a microfluidic chip in accordance with one or more embodiments described herein.

FIG. 9 illustrates a flow diagram of an example, non-limiting method 900 that can facilitate sample preparation, analysis, and/or screening using one or more microfluidic channels 100 that can comprise one or more nanoDLD arrays 102 in accordance with one or more embodiments described herein. Repetitive description of like elements employed in other embodiments described herein is omitted for sake of brevity.

At 902, the method 900 can comprise directing, by a microfluidic chip (e.g., via the first side 400 of the microfluidic chip), a sample fluid from a global inlet 106 and through one or more nanoDLD arrays 102 (e.g., into a global outlet 110). For example, the sample fluid can be a complex biological sample including, but not limited to: blood, urine, a cultured media, saliva, cerebral spinal fluid, plasma, serum, feces, lavage, sputum, tears, sweat, a combination thereof, and/or the like. As described herein, the one or more nanoDLD arrays 102 can be configured to laterally displace particles in one or more directions based on size. In various embodiments, the sample fluid can be directed to the one or more nanoDLD arrays 102 via one or more inlet buses 108 and can be directed from the one or more nanoDLD arrays 102 via one or more outlet buses 112.

At 904, the method 900 can comprise, directing, by the microfluidic chip (e.g., via the first side 400), a second fluid through one or more collection regions 104 that can extend from one or more local inlets 114, through the one or more nanoDLD arrays 102, and/or into one or more outlets (e.g., one or more local outlets 116). For example, the second fluid can be a fluid used to facilitate a preparation and/or modification process of particles within the one or more collection regions 104. For instance, the second fluid can be a buffer fluid. In various embodiments, the one or more local inlets 114 can be in fluid communication with one or more fluid reservoirs (e.g., one or more first fluid reservoirs 504) containing the second fluid on an adjacent side of the microfluidic chip (e.g., a second side 500).

At 906, the method 900 can comprise, displacing, by the one or more nanoDLD arrays 102, one or more samples comprised within the sample fluid in one or more lateral directions from the sample fluid and/or into the one or more collection regions 104. For example, the sample fluid can be directed to a portion of the one or more nanoDLD arrays 102 located between microfluidic channels 100, wherein the one or more nanoDLD arrays 102 can laterally displace the sample into a collection region 104 of one of the microfluidic channels 100. Additionally, the sample can flow through the one or more collection regions 104 into the one or more local outlets 116 along with the second fluid (e.g., a buffer fluid). In various embodiments, the one or more local outlets 116 can be in fluid communication with one or more fluid reservoirs (e.g., one or more second fluid reservoirs 506) that can collect the one or more samples on an adjacent side of the microfluidic chip (e.g., a second side 500). Advantageously, the method 900 can use of nanoscale DLD technology with a microfluidic chip to facilitate one or more sample preparation processes.

FIG. 10 illustrates a flow diagram of an example, non-limiting method 1000 that can facilitate sample preparation, analysis, and/or screening using one or more microfluidic channels 100 that can comprise one or more nanoDLD arrays 102 in accordance with one or more embodiments described herein. Repetitive description of like elements employed in other embodiments described herein is omitted for sake of brevity.

At 1002, the method 1000 can comprise directing, by a microfluidic chip (e.g., via the first side 400 of the microfluidic chip), a sample fluid from a global inlet 106 and/or through one or more nanoDLD arrays 102 (e.g., into a global outlet 110). For example, the sample fluid can be a complex biological sample including, but not limited to: blood, urine, a cultured media, saliva, cerebral spinal fluid, plasma, serum, feces, lavage, sputum, tears, sweat, a combination thereof, and/or the like. As described herein, the one or more nanoDLD arrays 102 can be configured to laterally displace particles in one or more directions based on size. In various embodiments, the sample fluid can be directed to the one or more nanoDLD arrays 102 via one or more inlet buses 108 and can be directed from the one or more nanoDLD arrays 102 via one or more outlet buses 112.

At 1004, the method 1000 can comprise, directing, by the microfluidic chip (e.g., via the first side 400), a second fluid through one or more collection regions 104 that can extend from one or more local inlets 114, through the one or more nanoDLD arrays 102, and/or into one or more outlets (e.g., one or more local outlets 116). For example, the second fluid can be a fluid used to facilitate a preparation and/or modification process of particles within the one or more collection regions 104. For instance, the second fluid can be a buffer fluid. In various embodiments, the one or more local inlets 114 can be in fluid communication with one or more fluid reservoirs (e.g., one or more first fluid reservoirs 504) containing the second fluid on an adjacent side of the microfluidic chip (e.g., a second side 500).

At 1006, the method 1000 can comprise, directing, by the microfluidic chip (e.g., via the first side 400), a third fluid from one or more second local inlets 202 and/or through the one or more nanoDLD arrays 102 (e.g., and/or into the global outlet 110) to form one or more streams of third fluid. For example, the third fluid can be a fluid used to facilitate a preparation and/or modification process of particles entering one or more collection regions 104. For instance, the third fluid can be a labeling fluid in accordance with one or more embodiments described herein. In various embodiments, the one or more second local inlets 202 can be in fluid communication with one or more fluid reservoirs containing the third fluid on an adjacent side of the microfluidic chip (e.g., a second side 500).

At 1008, the method 1000 can comprise, displacing, by the one or more nanoDLD arrays 102, one or more samples comprised within the sample fluid in one or more lateral directions from the sample fluid and/or into the one or more collection regions 104. For example, the sample fluid can be directed to a portion of the one or more nanoDLD arrays 102 located between microfluidic channels 100, wherein the one or more nanoDLD arrays 102 can laterally displace the sample into a collection region 104 of one of the microfluidic channels 100. The displacing at 1008 can comprise displacing the sample through the one or more streams of third fluid. For example, the one or more streams of third fluid can flow adjacent to the one or more collection regions 104, wherein the one or more samples can pass through the one or more streams of third fluid to enter the one or more collection regions 104. Additionally, the one or more samples can flow through the one or more collection regions 104 into the one or more local outlets 116 along with the second fluid (e.g., a buffer fluid). In various embodiments, the one or more local outlets 116 can be in fluid communication with one or more fluid reservoirs (e.g., one or more second fluid reservoirs 506) that can collect the one or more samples on an adjacent side of the microfluidic chip (e.g., a second side 500). Advantageously, the method 1000 can utilize a plurality of localized inlets (e.g., one or more local inlets 114 and/or one or more second local inlets 202) to enable complex (e.g., multi-stage) sample preparation processes using nanoscale DLD technology with a microfluidic chip.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is, of course, not possible to describe every conceivable combination of components, products and/or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    directing, by a microfluidic chip, a sample fluid from a global inlet into an inlet bus and through a deterministic lateral displacement array comprising alternating rows of inward displacement pillars and outward displacement pillars formed between and in fluid communication with a global inlet bus and an outlet bus, wherein the alternating rows are connected;
    directing, by the microfluidic chip, streams of buffer fluid through collection regions of the alternating rows; and
    displacing, by the nanoscale deterministic lateral displacement array, particles of interest comprised within the sample fluid into the streams of buffer fluid.

2. The method of claim 1, wherein the method further comprises:
    purifying, by the microfluidic chip, the particles of interest with the buffer fluid.

3. The method of claim 1, further comprising:
    directing, by the microfluidic chip, additional fluid from local inlets into the streams of buffer fluid.

4. The method of claim 3, wherein the additional fluid is a labeling fluid.

5. The method of claim 1, wherein the particles of interest comprise exosomes, and wherein the method further comprises:
    displacing, by the deterministic lateral displacement array, contaminate particles into an outlet bus, wherein the contaminate particles are smaller than the exosomes.

* * * * *